United States Patent [19]

Nuschak

[11] Patent Number: 5,343,996
[45] Date of Patent: Sep. 6, 1994

[54] DEVICE FOR QUICK CHANGE OF PIECE-SUPPORTING PALLETS IN AN ASSEMBLING MACHINE

[75] Inventor: Gianni Nuschak, Torino, Italy

[73] Assignee: Comau S.p.A., Grugliasco, Italy

[21] Appl. No.: 98,772

[22] Filed: Jul. 29, 1993

[30] Foreign Application Priority Data

Sep. 30, 1992 [IT] Italy .................. T092 U 000236

[51] Int. Cl.⁵ ............................................. B65G 47/00
[52] U.S. Cl. ................. 198/345.3; 29/33 P; 198/748
[58] Field of Search ............... 198/345.1, 345.3, 465.3, 198/468.1, 748; 29/33 P

[56] References Cited

U.S. PATENT DOCUMENTS

| | | | |
|---|---|---|---|
| 4,095,687 | 6/1978 | Shoiket | 198/345.3 |
| 4,533,034 | 8/1985 | Gregg | 198/345.3 |
| 4,674,620 | 6/1987 | Inoue | 198/345.3 |
| 4,974,392 | 12/1990 | Mondini | 198/468.1 |
| 5,109,974 | 5/1992 | Beer et al. | 198/345.3 |

*Primary Examiner*—Joseph E. Valenza
*Attorney, Agent, or Firm*—Sughrue, Mion, Zinn, Macpeak & Seas

[57] ABSTRACT

A device for rapidly feeding piece-supporting pallets to a machine includes a motorized belt whose upper run is fixed to a pallet gripping device which is slidably mounted on a guide rail.

2 Claims, 2 Drawing Sheets

DEVICE FOR QUICK CHANGE OF PIECE-SUPPORTING PALLETS IN AN ASSEMBLING MACHINE

The present invention relates to devices for rapidly feeding piece-supporting pallets to an assembling machine. The object of the invention is that of providing a device of the above indicated type which has a relatively simple and reliable structure and at the same time ensures a very high speed of introduction of the piece-supporting pallets into the machine tool or assembling machine.

In order to achieve this object, the invention provides a fast feeding device of the type indicated above, characterised in that it comprises, in combination:

- a pallet feeding line, including two side beds serving for guiding two pallets transporting chains,
- a fixed support structure located at the center between said beds and including a longitudinal guide rail,
- at least a gripping device for gripping a lower appendage of the pallet, said device being slidably mounted on said guide rail,
- a motorized endless belt, having an upper run fixed to said gripping device in order to drive a reciprocating movement thereof, including a forward stroke for introducing the gripped pallet into the machine and a rearward stroke subsequent to the release of the pallet, for coming back to the starting position.

Figure 1:
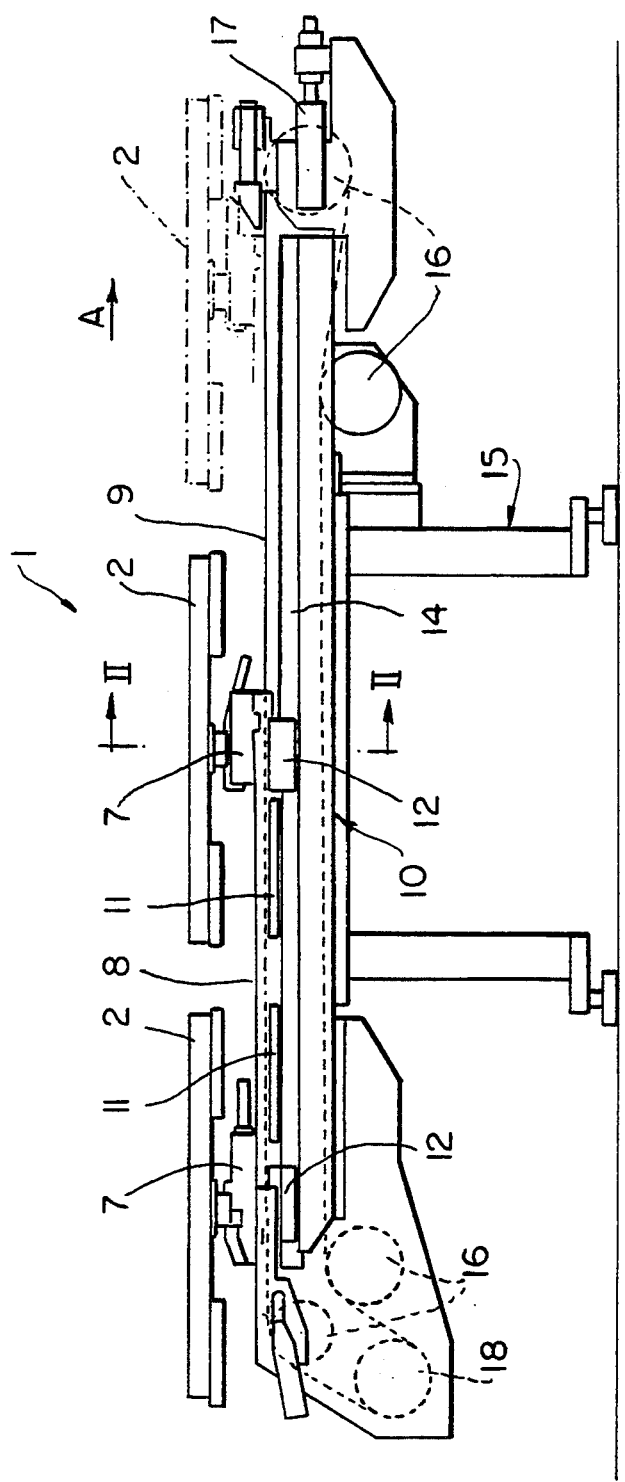
Figure 2:
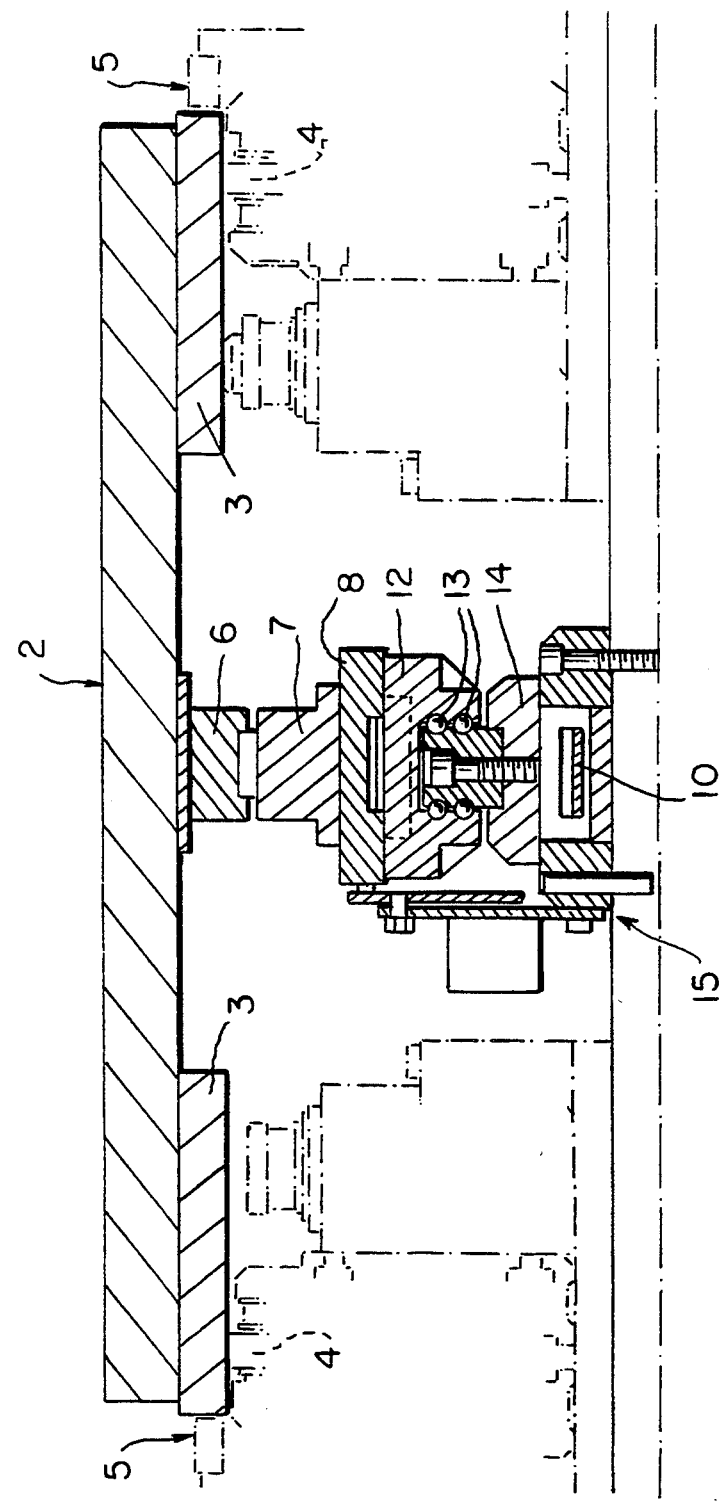

The invention will be described with reference to the annexed drawings, given purely by way of non limiting example, in which:

FIG. 1 is a diagrammatic side and elevational view of the device according to the invention, and FIG. 2 is a cross-sectional view along line II—II of FIG. 1.

In the drawings, reference numeral 1 generally designates a device for quick introduction of piece-supporting pallets 2 into an assembling machine or a machine tool. Pallets 2 are intended to support pieces (not shown) which are to be subject to mechanical assembling operations in the machine. With reference to FIG. 2, each pallet 2 includes at its lower side two side feet 3 which rest on transporting chains 4 (only partially shown in FIG. 2) which are guided within two side beds 5 of a pallet transporting line. The details of construction of said beds, the transporting chains and the corresponding driving means are not illustrated herein, since they are of a type known per se and do not fall within the scope of the present invention.

Each pallet 2 is provided at its lower side with an appendage 6 which is to be gripped by a gripping member 7. Also the details of construction of each gripping device 7 are not shown in the present description, since they are of any known type and do not fall within the scope of the invention. With reference to the specific illustrated example, there are provided two gripping members 7 whose structure is connected to a horizontal plate 8. Plate 8 is secured to the upper run 9 of an endless toothed belt 10. The upper run 9 of the toothed belt 10 is pinched between plate 8 which is located thereabove, and two counter plates 11 which are fixed to plate 8 by screws (not shown). The assembly of plate 8 and the two gripping devices 7 is rigidly connected to the upper run 9 of the toothed belt 10. In the present description and in the following claims, the term "endless belt" is used also to include the case in which the belt forms an open ring, the opposite ends of the belt being connected to the opposite ends of the plate 8. The assembly also includes two skids 12 which are slidably mounted (by interposition of balls 13 in the illustrated example) on a guide rail 14 carried by a fixed structure 15 located at the center between the two beds 5.

The toothed belt 10 is located longitudinally between the two beds 5 and is redirected over toothed pulleys 16. To one pulley 16 there is associated a belt tensioning device 17 of a type known per se whereas one of the pulleys over which there is engaged belt 10, indicated by reference numeral 18, is driven by an electric motor.

In operation, pulley 18 is driven so as to cause a reciprocating movement of the two gripping devices 7. The movement starts from the position illustrated with undotted line in FIG. 1. At such position, two pallets 2 brought by the chains 4 to the positions located over the two gripping devices 7, are gripped by such devices. The following movement in the direction of arrow A of belt 10 brings the pallet 2 illustrated on the right in FIG. 1 to the position indicated with dotted line, and the other pallet to the adjacent position. In such condition, the two pallets are introduced in the machine (not shown). The two pallets are thus released by the gripping devices 7 and the belt 10 is driven in the opposite direction to bring the two gripping devices 7 back to the starting position. In such condition, the device 7 which is illustrated on the right in FIG. 1 will be able to grip the second coming pallet in the line, whereas the other gripping device 7 will be able to grip a new pallet which has come above the device. The above mentioned cycle of operations is repeated continuously so as to feed the various pallets subsequently to the machine.

Whereas the use of transporting belts is known in general, the specific application of a toothed belt of the type described above in the field which has been indicated and for the specified purposes is new and unobvious and achieves advantages of rapidity of introduction of the pieces in the machine along with relative semplicity of construction.

Naturally, the principle of the invention remaining the same, the details of construction may amply vary with respect to what has been described purely by way of example.

I claim:

1. Device for rapidly feeding piece-supporting pallets to a machine, comprising:
   - a pallet feeding line including two side beds serving for guiding two pallet transporting chains,
   - a fixed support structure located at the center between said two beds and including a longitudinal guide rail,
   - at least a gripping device for gripping a lower central appendage of a pallet, said device being slidably mounted on said guide rail,
   - a motorized endless belt, whose upper run is fixed to said gripping device for driving a reciprocating movement thereof, including a forward stroke for introducing the pallet into the machine, and a rearward stroke subsequent to the release of the pallet, for coming back into the starting position.

2. Device according to claim 1, wherein there are provided two gripping devices connected by a plate which is secured to the upper run of said endless belt, each gripping device being provided at its lower side with a skid slidably mounted on the guide rail.

* * * * *